United States Patent
Yin et al.

(10) Patent No.: US 12,241,454 B2
(45) Date of Patent: Mar. 4, 2025

(54) METHOD FOR CONTROLLING REACTIVE POWER EXCHANGE BETWEEN A POWER GRID AND A WIND POWER PLANT

(71) Applicant: VESTAS WIND SYSTEMS A/S, Aarhus N (DK)

(72) Inventors: Bo Yin, Ikast (DK); Torsten Lund, Fredericia (DK); Gert Karmisholt Andersen, Hovedgård (DK); Kouroush Nayebi, Ikast (DK); Manoj Gupta, Jaipur (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/263,879

(22) PCT Filed: Jan. 20, 2022

(86) PCT No.: PCT/DK2022/050011
§ 371 (c)(1),
(2) Date: Aug. 1, 2023

(87) PCT Pub. No.: WO2022/167048
PCT Pub. Date: Aug. 11, 2022

(65) Prior Publication Data
US 2024/0120740 A1    Apr. 11, 2024

(30) Foreign Application Priority Data
Feb. 4, 2021    (DK) .............. PA 2021 70052

(51) Int. Cl.
*F03D 7/00*    (2006.01)
*F03D 7/02*    (2006.01)
*H02J 3/18*    (2006.01)

(52) U.S. Cl.
CPC .......... *F03D 7/0284* (2013.01); *H02J 3/1878* (2013.01)

(58) Field of Classification Search
CPC .............................. H02J 3/1878; F03D 7/0284
See application file for complete search history.

(56) References Cited

U.S. PATENT DOCUMENTS

| | | |
|---|---|---|
| 2008/0150283 A1 | 6/2008 | Rivas et al. |
| 2011/0178646 A1 | 7/2011 | Haj-Maharsi et al. |

(Continued)

FOREIGN PATENT DOCUMENTS

| | | | |
|---|---|---|---|
| EP | 3591785 A1 | 1/2020 | |
| EP | 3736938 A1 | 11/2020 | |
| GB | 2410386 A | * 7/2005 | ............ H02J 3/1878 |

OTHER PUBLICATIONS

PCT, Notification of Transmittal of the International Search Report and the Written Opinion of the International Searching Authority, or the Declaration for Application PCT/DK2022/050011 dated Apr. 4, 2022.

(Continued)

*Primary Examiner* — Julio C. Gonzalez
(74) *Attorney, Agent, or Firm* — Patterson + Sheridan, LLP (57) ABSTRACT

The invention relates to wind turbines, particularly to controlling reactive power exchange between a power grid and a wind power plant. The wind power plant has a plurality of wind turbine generators each having a corresponding power converter with a converter controller. Further, the wind power plant has a power plant transformer with an on load tap changer coupled between the wind power plant and the power grid. The power plant controller is regulating the on load tap changer and is generating reactive component setpoints for the wind turbine generators, when determining (Continued)

a need for production of short-term reactive power due to a sudden change in reactive power measured at the point of common coupling.

14 Claims, 6 Drawing Sheets

(56) References Cited

U.S. PATENT DOCUMENTS

| | | | |
|---|---|---|---|
| 2014/0062085 A1* | 3/2014 | Larsen | H02J 3/381 290/44 |
| 2018/0119674 A1* | 5/2018 | Kjær | H02J 3/381 |
| 2020/0011297 A1* | 1/2020 | Hillebrandt | H02P 9/006 |

OTHER PUBLICATIONS

Danish Patent and Trademark Office, 1st Technical Examination including the Search Report and Search Opinion for Application PA 2021 70052 dated Aug. 23, 2021.

* cited by examiner

METHOD FOR CONTROLLING REACTIVE POWER EXCHANGE BETWEEN A POWER GRID AND A WIND POWER PLANT

FIELD OF THE INVENTION

The present invention relates to wind turbine generators, particularly to controlling reactive power exchange between a power grid and a wind power plant.

BACKGROUND OF THE INVENTION

A wind power plant comprises a plurality of wind turbine generators (WTG) delivering power for a power grid. The wind power plant is controlled by a power plant controller, which implements requirements, for delivering power to the power grid, set out by a transmission system operator (TSO) or by grid interconnection requirements. The requirements are usually defined in country specific grid codes. The TSO also is setting power delivery demands to the power plant controller (PPC), including reactive power delivery demands.

Wind power plants may be configured to support network faults or sudden change in power grid by injection of higher levels of power, when a sudden change in voltage occurs. Such a functionality is widely required from the connected wind turbines by the transmission system operator. This implies that the wind power plant must be designed to provide sudden increase or decrease in power and reactive power when required during sudden changes in a power grid.

When there is sudden changes in grid voltage, where the voltage steps are within the normal operating range of e.g., 90% to 110% at point of common coupling (PCC), many TSOs requires that the plant is able to move its reactive power capability from e.g., maximum reactive power (Qmax) to minimum reactive power (Qmin) with a short duration. However, the reactive power capability has normally been obtained with utilization of a tap-changing transformer performing actions to maximise the reactive power capability of the plant. During short duration specified by TSOs, it is not possible for the tap changer of the transformer to tap to the corresponding position with respect to the new voltage level within the required time.

To be able to meet this requirement, installation of compensation equipment such as capacitor banks, static synchronous compensator (STATCOM) or a static VAR compensator (SVC) is common. However, over-dimensioning the wind power plant to provide power and reactive power above the nominal level increases investment costs without the benefit of increasing the nominal power production capability of the wind turbine.

Thus, it is a problem to provide an efficient design of wind turbines that meet requirements with respect to controlling reactive power exchange between a power grid and a wind power plant during a sudden change in voltage, which is both efficient and economic, without over-dimensioning the wind power plant with compensation equipment.

Hence, an improved method for controlling reactive power exchange during a sudden change in voltage would be advantageous, and in particular a more efficient and/or reliable method would be advantageous.

OBJECT OF THE INVENTION

It is an object of the invention to address the above mentioned problems.

In particular, it may be seen as an object of the present invention to provide a method for controlling reactive power exchange that solves the above mentioned problems of the prior art with reacting fast to a power change without over-dimensioning the wind power plant.

SUMMARY OF THE INVENTION

Thus, the above described object and several other objects are intended to be obtained in a first aspect of the invention by providing a method for controlling reactive power exchange between a power grid and a wind power plant, the wind power plant comprises:
a plurality of wind turbine generators each having a corresponding power converter with a converter controller,
a power plant controller generating reactive component setpoints for the wind turbine generators, and
a transformer with an on load tap changer coupled between the wind power plant and the power grid, the method comprises the following steps:
determining the need for reactive power exchange between the wind power plant and the power grid,
adjusting the configuration of the on load tap changer in the transformer; and
generating by the power plant controller reactive component setpoints for the wind turbine generators, wherein the reactive component setpoints comprise a steady state part and a short-term part, wherein the steady state part does not exceed steady state capabilities of the power converter of the wind turbine generator, and wherein the short-term part exceeds the steady state capabilities of the power converter of the wind turbine generator; and
operating the wind turbine generators in accordance with the reactive component setpoints.

The power plant transformer is able to regulate voltage at the medium voltage side of the transformer by changing the tap position of the on load tap changer (OLTC) to maximize the reactive power capability of the wind power plant. However, according to various grid code requirements, the performance requirement of reactive power regulation have to be achieved in a very short time. The fast reactive power regulation cannot be achieved with reliance on a tap-changing transformer alone, because the effect of changing the settings of the on load tab changer (OLTC) is to slow to meet the grid code requirements.

As a result, the reactive power capability obtained with the OLTC cannot be fully utilized to fulfil the performance requirement for fast reactive power regulation. Usually in prior art the gaps between desired and measure power may be mitigated by installing compensation equipment such as capacitor banks, static synchronous compensator (STATCOM) or a static VAR compensator (SVC) before the OLTC is settling down to the new position where the voltage recovers back to around e.g., 1.0 pu. However, using compensation equipment is an expensive solution; therefore, instead the gaps are mitigated by utilization of the power converters short-term overload capability. The short-term overload capability is the extra reactive power the power converters can deliver by overloading the power converters by running the power converters at a level that exceeds the normal capability of some of the power converter components, which therefore is warming up. This can only be done for a short time, as the components not must overheat and be damaged. Therefore, in this invention the grid code requirements for a fast reaction to voltage change is met by combining the use of the power plant transformers OLTC with short-term overload of the power converters. The method is determining the need for reactive power exchanged by measuring the reactive power, voltage and frequency at a point of common coupling (PCC), where the wind power plant is connected to the power grid, and comparing the measured power with a requested power reference received from the transmission system operator.

If there is a difference between the measured reactive power and the requested reactive power, the method comprises combining a long-term strategy and a short-term strategy for taking action to change the reactive power exchange.

The long-term strategy is adjusting the configuration of the OLTC in the power plant transformer. However, it takes some time, 120-300 seconds or more, for the adjustment of the OLTC to give the desired change in reactive power. Therefore, a short-term strategy is also applied, where the power plant controller is requesting the wind turbine generators to generate extra reactive power by overloading the power converters until the adjustments of the tap changers provide the required reactive power.

As adjusting the OLTC takes effect according to the long-term strategy, the short-term strategy of overloading the power converters are gradually reduced until eventually the short-term strategy is ended and the OLTC provides all the requested power output and the wind power plant is running normally. This cooperation between using a long-term strategy by regulating the on load tap changers in the power plant transformer and using a short-term strategy of overloading the power converters is solving the problem of the invention. Changing the on load tap changers are too slow for an immediate reaction to a drop in reactive power, whereas overloading the power converters only can be done for a short time, a few minutes. By combining the two strategies by first applying the short-term strategy and then gradually shifting to the long-term strategy is making it possible to react fast and keep the change for a longer duration.

The power plant controller is generating reactive component setpoints for the wind turbine generators to change quickly the reactive power delivered from the wind turbine generators by short-term overloading the power converters. The reactive component setpoints may be reactive power setpoints, and/or voltage setpoints and/or power factor setpoints. The reactive power setpoints may be inductive-reactive setpoint and capacitive-reactive setpoint. If voltage setpoints or power factor setpoints are generated by the power plant controller, and transmitted to the power converters, the power converters may convert the setpoints to a reactive power setpoint.

Each wind turbine generator comprises a power converter that is capable of adjusting the generator frequency and voltage, and thereby the reactive power, and transmit the reactive power via a medium voltage network within the wind power plant to the power plant transformer.

A change in reactive power by utilizing short-term overload of the power converters can occur almost immediately to insure the wind power plant delivers the requested reactive power for the power grid. However, each wind turbine generator may only be able to generate extra reactive power for a very short time, perhaps only for a few seconds. When the wind power plant needs to deliver short-term reactive power, the power plant controller is operating the wind turbine generators by shifting between the pluralities of wind turbine generators, during the period where the short-term reactive power production is needed, until the power plant transformer takes over, according to the adjustment of the OLTC.

The wind power plant may distribute the required short-term reactive power production between the pluralities of wind turbine generators equally, by requesting all active wind turbine generators to deliver a fraction of the required short-term reactive power. Alternatively, the power plant controller may be shifting between requesting the individual wind power generators to deliver extra short-term reactive power by first requesting one or more of the wind turbine generators to deliver short-term reactive power, and then, when a wind turbine generator has reached the limit for how much it can deliver, the power plant controller requests other wind turbine generators to deliver short-term reactive power.

The power plant controller may requests generation of short-term reactive power from a wind turbine generator by sending an boost-enable signal to the wind turbine generator, making the wind turbine generator start-up the overload functionality in the wind turbine generator. Further, the power plant controller changes the reactive component setpoints the power plant controller is transmitting to the wind turbine generator.

The wind turbine generators may deliver a steady state part and a short time part of reactive power. The steady state part is the reactive power the wind turbine generators may deliver constantly, at least as long as external conditions, such as wind and external temperature, are not changing. The wind turbine generators may be able to deliver a short-term part of reactive power by increasing the power supplied beyond the steady state part by overloading the power converters of the wind turbine generators. This will however cause components in the power converter of the wind turbine generators to warm up, and when the power converter, or a component in the inverter, reaches a maximum allowable temperature, the wind turbine generator must stop delivering the extra reactive power, the short-term part.

When delivering the steady-state part of reactive power, the temperature of the power converter components in the wind turbine generator is substantially constant and the wind turbine generator may continuously deliver the steady state part of the reactive power and not exceed steady state capabilities.

When the reactive component setpoint contains a short-term part different from zero, the short-term reactive power generation is applied.

The steady-start part may by changed in the wind turbine generator, for instance the wind turbine generator may comprise a generator on load tap changer, which may be adjusted just like the power plant on load tap changer, but this is to slow and will usually not be done, when a sudden change in reactive power is detected. The generator tap changers may be utilized in a long-term strategy, but not as part of a short-term strategy.

According to an embodiment of the method the power plant controller is receiving capability data from the converter controllers, the capability data comprises
- short-term reactive power overload capabilities, and/or
- remaining time for short-term reactive power overload capabilities, and/or
- remaining reactive power overload capabilities factor.

The power plant controller receives capability data from the wind turbine generators. The capability data comprises data about how much short-term reactive power the wind turbine may provide when overloading the power converter and for how long. The time limit for remaining time for short-term reactive power overload capabilities is determined to avoid exceeding the thermal capacity of one or more components in the power converter. A time limit is important to avoid components overheating and being damaged. When the reactive power overload capabilities of the power converter of a wind turbine generator is exhausted, the wind turbine generator automatically reduces the production of short-term reactive power to a safe level to avoid overheating components. This is done regardless of whether new setpoints have been received from the power plant controller.

The power plant controller may receive capability data comprising the remaining reactive power overload capability factor, informing the power plant controller about how large a part of the reactive power overload capability is remaining, this may be a fraction or a percentage about how much of the reactive power overload capability is remaining. The power plant controller may know how much reactive power overload capability is available under normal conditions, when not utilizing the reactive power overload capability, and then, from the capability factor, calculate the available overload capability.

According to an embodiment, the capability data further comprises the steady state capabilities for reactive power.

In addition, the capability data may comprise data about how much steady state reactive power the wind turbine generator may provide. How much steady state reactive power the wind turbine generator may provide depends on weather conditions, wind speed, temperature etc. There may also be different setting of the power converter, increasing or reducing the steady state capabilities.

In the short-term strategy, the steady state capabilities will not be changed, but in the long-term strategy, changing the setpoints for the steady state part may be included in the strategy.

According to an embodiment of the method the converter controllers each are:
generating the capability data, and
transmitting the capability data to the power plant controller.

A wind turbine generators converter controller generates the capability data based on measurements of temperature of components in the power converter. Each wind turbine generator may comprise a control system, and the control system may have a module for generating capability data for the wind turbine generator based on measurements of temperature of the component and on thermic data for the components. Such a module is described in WO2018/103800.

The converter controllers transmits the capability data to the power plant controller; this is done continuously within predefined time intervals. For instant, the converter controller may send the capability data after a time interval has elapsed since the last transmission, or when external conditions like wind speed or external temperatures are changing.

Alternatively, the power plant controller may request the data from the wind turbine generator, and the converter controller responds to such a request by sending the requested data.

According to an embodiment of the method, the converter controllers each are:
generating delivery data for how much of the short term reactive overload capabilities has been delivered from the wind turbine generator, and
transmitting the delivery data to the power plant controller.

The converter controllers may transmit to the power plant controller how much of the short-term reactive overload capabilities has been delivered to the power plant controller. This is calculated based on temperature measurements of the components in the power converter, I such a way that the temperature measurements are used to calculated how much of the overload capabilities are used. The delivery data makes the power plant controller know, how much of the short-term reactive overload capabilities that has been used, and the power plant controller estimates how much is left, before the short-term reactive overload capabilities for the power converter of a wind turbine generator is exhausted.

It may be that the wind turbine generator is unable to deliver the amount of reactive power requested by the power plant controller. Transmitting delivery data to the power plant controller is a way for the wind turbine generator to inform the power plant controller about how much of the overload capability of generating reactive power has been used. If less is delivered than requested by the power plant controller, the power plant controller may adjust its strategy for instance by requesting other wind turbine generators to deliver more.

According to an embodiment, the method further comprises that the power plant controller is:
receiving the capability data from the converter controllers, and
generating reactive component setpoints for the converter controllers based on the capability data,
transmitting reactive component setpoints to the converter controllers.

The power plant controller generate reactive component setpoints based on the capability data it receives from the converter controllers and transmits the reactive component setpoints to the converter controllers.

According to an embodiment of the method, the reactive component setpoint transmitted to a wind turbine generator is a sum of the steady state part and the short-term part.

According to an embodiment of the method, the reactive component setpoint transmitted to a wind turbine generator comprises the steady state part and the short-term part as specific values for each part.

The reactive component setpoints may comprise two parts, a steady state part and a short-term part. In this case, the reactive component setpoints may be separate specific setpoints for the steady state part and the short-term part. The steady state part is how much the wind turbine generator is requested to deliver constantly as long as the wind speed and temperature is not changing, and the short-term part of the setpoint is how much the wind turbine generator is requested to deliver beyond the steady state by using short-term capabilities.

Alternatively, the reactive component setpoint may be a single setpoint for the total requested delivery. In this case, the converter controller for the wind turbine generator calculates how to meet the setpoint by how much it can deliver by steady state capabilities and short-term overload capabilities respectively.

According to an embodiment of the method, if the short-term overload capability of the power converters are not sufficient to meet the reactive power demands, the power plant controller activates compensation equipment.

Besides adjusting the configuration of on load tap changers in the transformer and utilizing short-term reactive power overload capabilities in the wind turbine generators, the wind power plant may comprises reactive power compensation equipment such as a capacitor bank, a static synchronous compensator (STATCOM) or a static VAR compensator (SVC). The compensation equipment is configured to provide reactive power compensation when requested by the power plant controller.

The reactive power compensation equipment is requested to deliver reactive power, when the short-term reactive power capabilities in the wind turbine generators are unable to deliver sufficient reactive power to fulfil the requirements.

By using compensation equipment the power plant enters into a three-step strategy, adjusting the OLTC, overloading the power converters and using compensation equipment in case overload the power converters do not supply sufficient short term reactive power. The compensation equipment then deliver the difference between the needed short-term reactive power and the short-term reactive power overloading the power converters can supply.

According to an embodiment, the method further comprises that the need for short-term reactive power exchange is determined, when
- the difference between the requested reactive power level and the a supplied reactive power level measured at the point-of-common-coupling is larger than a minimum-allowed-change-value, and/or
- the steady-state delivery of reactive power is exceeding a maximum fraction of the reactive power steady-state capabilities, and/or
- the measured voltage at the point-of-common-coupling is within an allowable-voltage-range.

The reactive power level is measured at the point-of-common-coupling and is compared to the requested reactive power level from the system operator. If the reactive power level is differing, more than a minimum allowed value, from the requested reactive power level, there is a need for short-term reactive power exchange.

Alternatively, if the steady-state delivery of reactive power exceeds a fraction of the maximum reactive power state-state capabilities, for instance a fraction of 0.90 or 0.95 or 0.98 of the maximum reactive power state-state capabilities, then there may be determined a need for short-term reactive power exchange to ensure delivery of the requested reactive power.

Further, there may be a requirement that the measured voltage at the point-of-common-coupling is within an allowable range. This range may be between 0.9 and 1.1 pu. If the measured voltage is outside this range, the wind park should not deliver short-term reactive power, the problem of the voltage being outside the range must be solved elsewhere in the power grid by the system operator. It may be possible to operate outside the range in case of a fault situation.

According to an embodiment, the method further comprises that when determining the need for reactive power exchange and adjusting the configuration of the on load tap changer in the transformer, the on load tap changer (OLTC) gradually changes the voltage level at the medium voltage side of transformer, and the reactive component setpoints are generated for the wind turbine generators to supply the required reactive power, and the reactive component setpoints are gradually adjusted to compensate for the gradually changes caused by the on load tap changers.

When the OLTC in the transformer of the wind park is adjusted, the effect of adjustment gradually takes effect, and therefore the reactive component setpoints are gradually adjusted to be reducing the impact from the short-term reactive power production to compensate for the adjustment of the OLTC. Thereby, the transformer takes over producing the required reactive power, and the short-term reactive power production gradually is phased out, until the short-term reactive power production is no longer needed.

According to an embodiment, the method further comprises that operating the wind turbine generators, when the short-term part of the reactive component setpoints is different from zero, comprises overloading the power converters of the wind turbine generators to generating more reactive power than the maximum steady state power generation.

Overloading the power converters of the wind turbine generators may be done by going in an over-boost mode. Then the wind turbine generator operates in a higher operational level than it would during normal use. Operating in over-boost mode can cause components to reach their thermal limits. Therefore, when operating in over-boost mode, that mode must not be sustained for longer than the particular duration or damage will be caused.

The duration for which an over-boost level can be sustained can be predicted by the control system. The power converters can provide extra reactive power capability above normal as long as the thermal temperature of all the critical components are within their limits.

In a second aspect, the invention relates to a wind power plant comprising:
- a plurality of wind turbine generators each having a corresponding power converter with a converter controller,
- a power plant controller generating reactive component setpoints for the wind turbine generators,
- a transformer with a on load tap changer coupled between the wind power plant and a power grid,
- when a need for reactive power exchange between the wind power plant and the power grid is determined, the configuration of the on load tap changer is adjusted, and
- the power plant controller generates reactive component setpoints for the wind turbine generators, wherein the reactive component setpoints comprise a steady state part and a short-term part, wherein the steady state part does not exceed the steady state capabilities of the power converter of the wind turbine generator, and wherein the short-term part exceeds the steady state capabilities of the power converter of the wind turbine generator; and
- the wind turbine generators are operated in accordance with the reactive component setpoints.

In a third aspect, the invention relates to a power plant controller for controlling reactive power exchange between a power grid and a wind power plant, comprising:
- a plurality of wind turbine generators each having a corresponding power converter with a converter controller,
- a power plant controller generating reactive component setpoints for the wind turbine generators,
- a transformer with a on load tap changer coupled between the wind power plant and the power grid,
- wherein the power plant controller is arranged to perform the steps according to the first aspect of the invention.

In a fourth aspect, the invention relates to a computer program product comprising software code adapted to control a wind turbine when executed on a data processing system, the computer program product being adapted to perform the method according to the first aspect of the invention.

In a fifth aspect, the invention relates to a computer program product being adapted to enable a computer system comprising at least one computer having data storage means in connection therewith to control an wind power plant according to the second aspect of the invention, such as a computer program product comprising instructions which, when the program is executed by a computer, cause the computer to carry out the method of the first aspects aspect of the invention.

This aspect of the invention is particularly, but not exclusively, advantageous in that the present invention may be accomplished by a computer program product enabling a computer system to carry out the operations of the wind power plant of the second aspect of the invention when down- or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The wind power plant and the method to control the wind power plant according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
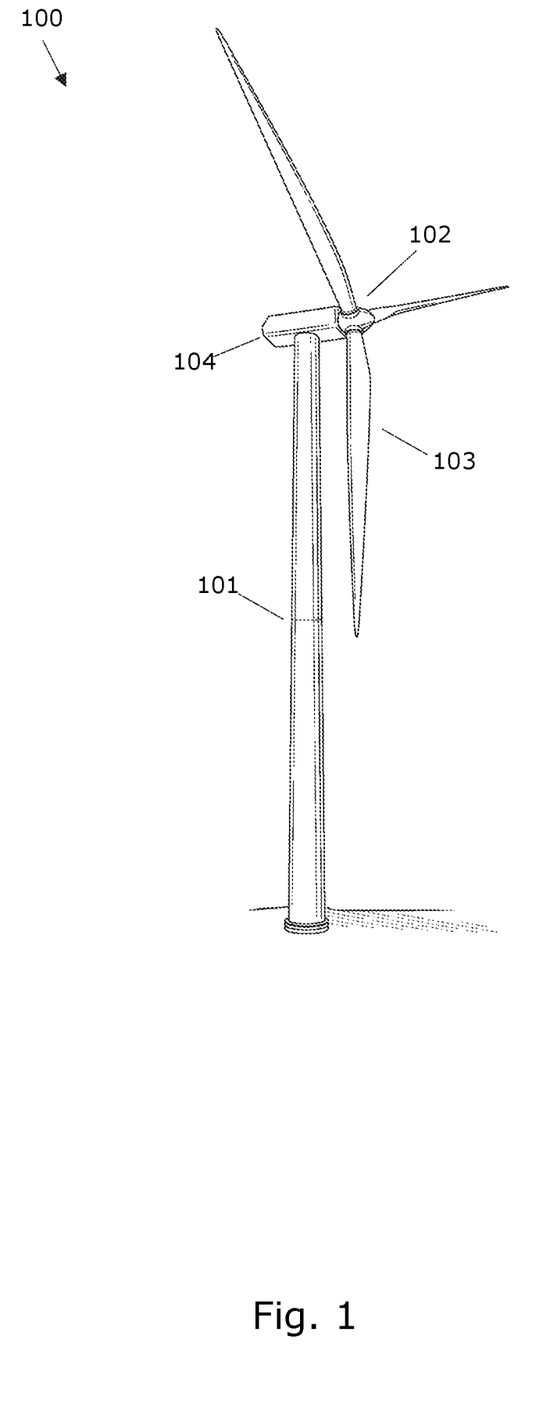
FIG. 1 illustrates a wind turbine.

FIG. 1 shows a wind turbine generator 100 (WTG) comprising a tower 101 and a rotor 102 with at least one rotor blade 103, such as three blades. The rotor is connected to a nacelle 104, which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter, which comprises a generator side converter and a line side converter. The generator side converter converts the generator AC power into DC power and the line side converter converts the DC power into an AC power for injection into the power grid.

Figure 2:
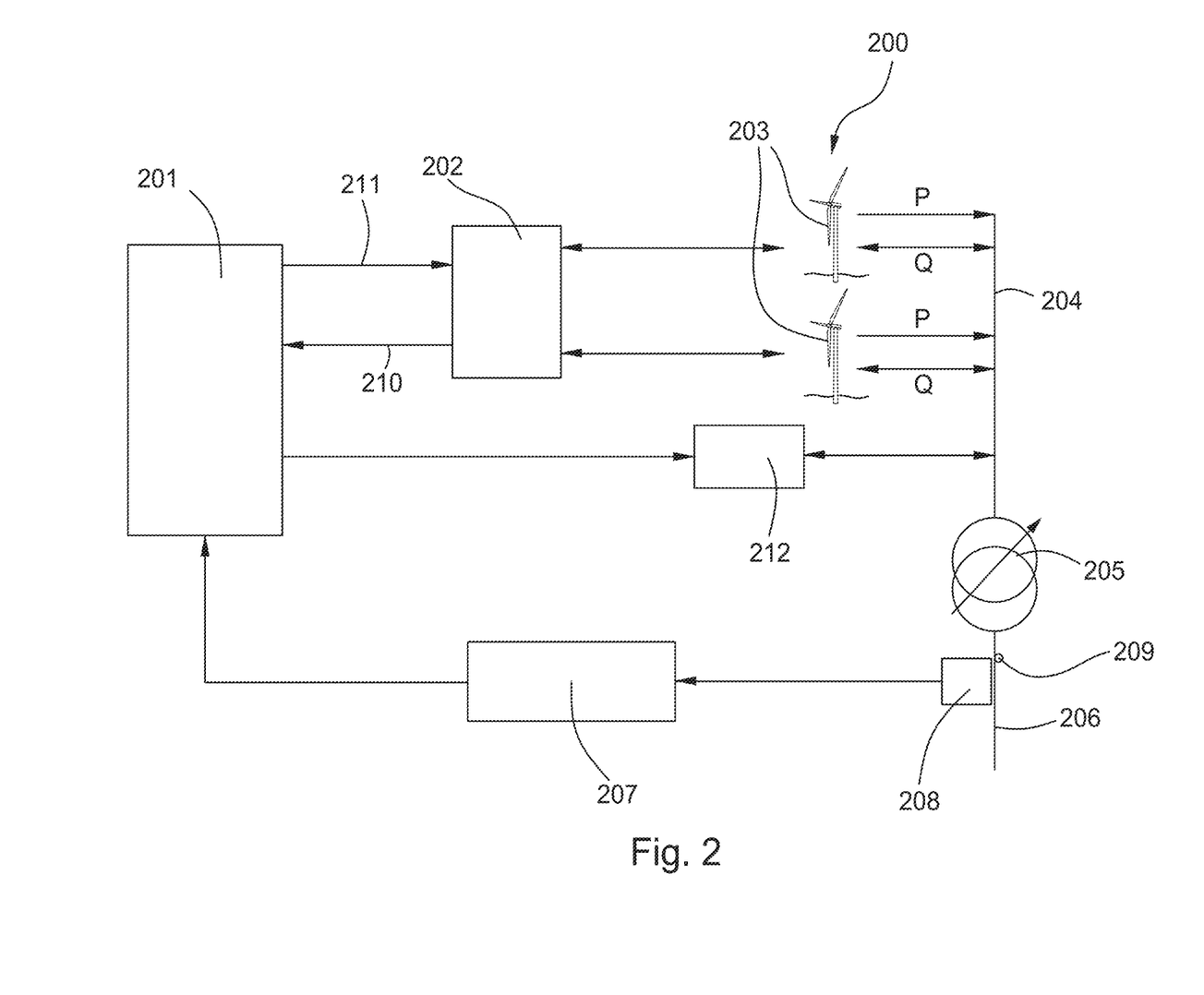
FIG. 2 illustrates an overview of the communication between the power plant controller, the wind turbine generators and the power grid operator.

FIG. 2 shows an overview of the communication between the power plant controller 201, the wind turbine generators 203 via a WTG communication module 202 and the power grid operator. The wind turbine generators 203 are connected to an internal medium voltage network 204 to which the wind turbine generators 203 are transmitting real power P, transmitting, and receiving reactive power Q. The medium voltage network 204 is connected to a transformer 205, wherein the voltage is transformed from the medium voltage network 204 to a high voltage network 206. The transformer 205 comprises an on load tap changer. A power measurement module 207 are having sensors 208 for measuring voltage, current, real power and reactive power at a point of common coupling 209. The power measurement module 207 may be part of the power plant controller 201 or transmits the measured values to the power plant controller 201. The power plant controller 201 is communicating via a WTG communication module 202 with the wind turbine generators 203.

From the wind turbine generators 203 the power plant controller receives capability data 210 about short-term reactive power overload capabilities and remaining time for short-term reactive power overload capabilities and steady state power capabilities. Based on the voltage, current and power measurements by the sensors 208 and the capability data 210 from the wind turbine generators 201, the power plant controller 201 determines reactive component setpoints and real component setpoints and transmit the setpoints via the transmission line 211 to the wind turbine generators 203. In addition, other data may be transmitted via the transmission line 211 to the wind turbine generators.

Compensation equipment 212, such as a capacitor bank, a static synchronous compensator (STATCOM) or a static VAR compensator (SVC) is connected to the medium voltage network 204 in parallel to the wind turbine generators 203. The compensation equipment 212 is configured to provide reactive power compensation when requested by the power plant controller 201, typically when the short-term reactive power capabilities in the wind turbine generators 203 are unable to deliver sufficient reactive power to fulfil the requirements.

Figure 3:
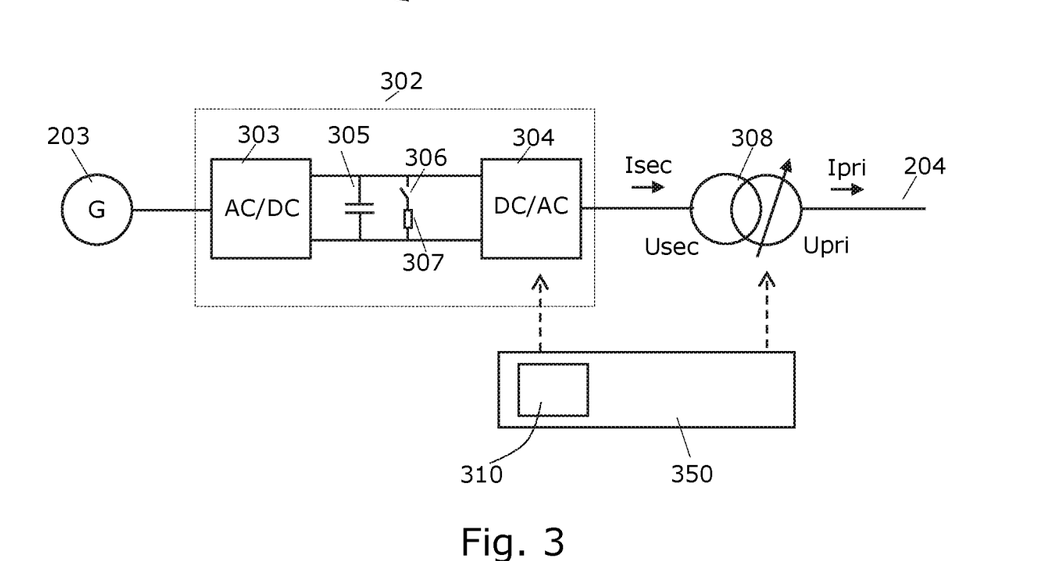
FIG. 3 illustrates an example of a power system of a wind turbine generator.

FIG. 3 shows an example of a power system 300 of a wind turbine generator 203 according to an embodiment. The power system comprises a wind turbine generator 203 and a power converter 302. The power converter 302 comprises a generator side converter 303, a line side converter 304, a DC-link 305 and a resistor 307 connected with a controllable switch 306. The resistor and switch forms a power dissipation device, also known as a chopper, for dissipating active power. The DC-link 305 comprises one or more DC-link capacitors, which are charged by the DC output current from the generator side converter 303 and which supplies DC power to the line side converter 304. The output AC current from the line side converter 304 is supplied via output inductors and possibly via a wind turbine transformer 308 to the medium voltage power network 204.

The medium voltage power network 204 receives power from several wind turbine generators 203. Thus, The medium voltage power network 204 and one or more power systems 300 of corresponding wind turbine generators constitutes a wind power plant or park arranged to supply power to a power grid, i.e. the high voltage network 206.

The high voltage network is also commonly known as the high voltage grid, i.e. a power network for distribution of electrical power.

The medium voltage power network 204 and the high voltage network 206 are commonly referred to as a network or power network.

The power converter 302 may be full-scale converter configured according to different principles including forced-commutated and line-commutated converters. However, any embodiment described herein equally applies to doubly-fed induction generator configurations as well and other equivalents to such generator configurations and other AC-to-AC power converters.

The wind turbine transformer 308 is a variable turns ratio transformer which enables adjustment of the turns ratio and thereby the voltage ratio of a primary side voltage Upri of the transformer and secondary side voltage Usec of the transformer. The transformer 308 is also known as an On Load Tap Changer transformer—in short, an OLTC transformer 308—having several tapping points which enable the turns ratio of the transformer to be varied.

Since the variable turns ratio of primary and secondary transformer sides equals the ratio of the primary and secondary voltages, i.e. the turns ratio Npri/Nsec equals Upri/Usec, this enables adaptation of the voltage seen by the line side converter 304. This can be used to provide network voltage support in situations of network under-voltage events, or network over-voltage events, i.e. in situations where the voltage on the high voltage network increases or decreases outside a nominal voltage region.

Thus, the adjustable turns ratio can be used to maintain the secondary voltage Usec within an acceptable working range of the power converter 302, e.g. to avoid tripping of the power converter 302.

The power system 300 is principally illustrated and therefore does not explicitly reveal that the system may be a three-phase system. However, principles of the described embodiments apply both to single and multi-phase systems.

FIG. 3 also shows a control system 350 for operating the wind turbine. The control system 350 is configured to monitor the operating status of the wind turbine generator 203 to maintain an optimized energy generation, and is configured to communicate with the power plant controller 201 and possible other control systems. The control system 350 is capable of altering the operation of components of the wind turbine generator 203 power system 300 to effect changes in the reactive and active power output in reaction to the setpoints received from the power plant controller 201.

The control system 350 monitors parameters relating to the thermal status of the power system 300 including the wind turbine generator 203. Parameters, for example, may include ambient temperature, temperature of individual components, voltage and current levels and reactive and active power generation. Monitoring of said parameters is then used by the control system 350 to predict the potential for components to be driven above their capabilities without exceeding a thermal limit.

The control system 350 comprises a converter controller 310 for controlling the power converter 302. The converter controller 310 may be a part of the control system 350 or it may be an independent part outside the control system in communication with the control system.

Figure 4:
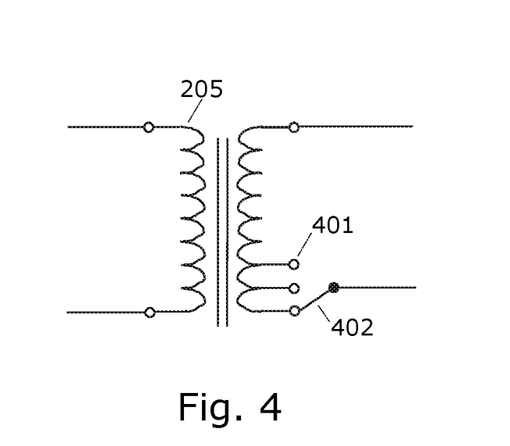
FIG. 4 illustrates an on load tap changer transformer with taps.

FIG. 4 illustrates an on load tap changer transformer 205 with taps 401 providing different turns ratios and an on load tap changer 402 arranged to be switched between different taps 401. There are multiple technologies for on load tap changer. While these particular technologies are not described in detail here, they all exhibit the particular property that the on load tap changer can be switched and that the current during switching must be kept below a certain limit, defined by the OLTC apparatus ratings.

There is an on load tap changer in the power plant transformer 205, but there may also be local tap changers in each wind turbine transformer 308.

Figure 5:
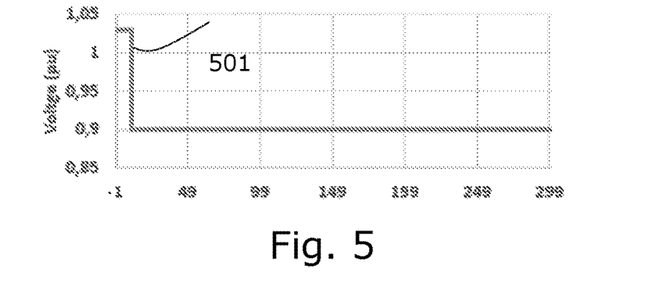
FIG. 5 illustrates a voltage drop at the point-of-common-coupling (PCC).

FIG. 5 illustrates a measured voltage drop 501 at the point-of-common-coupling (PCC) requiring the wind park to change the delivery of reactive power.

Figure 6:
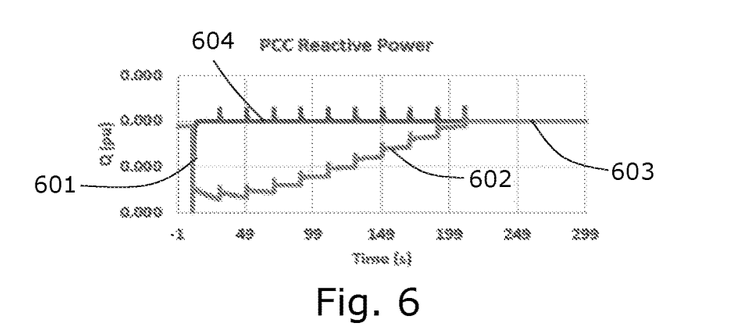
FIG. 6 illustrated that a drop in reactive power is measured at the point-of-common-coupling (PCC).

FIG. 6 illustrates that at the same time as the voltage drop occurs, there also is a drop 601 in reactive power Q measured at the point-of-common-coupling. When the power drop 601 in reactive power Q occurs, the on load tap changer in the power plant transformer is adjusting and step wise increasing the reactive power Q, see the graph 602, until eventually after more than 200 seconds reaching the requested level 603. In the meantime, generation of short-term reactive power 604 kicks in to ensure the power plant delivers the requested reactive power. The graph 604 shows the sum of the reactive power generated by normal steady-state means and by short-term means. Using short-term reactive power allows the wind power plant to react quickly on a power drop, and immediately, by utilizing short-term reactive power production by overloading the power converters of the wind turbine generators short-term, compensate for the power drop and deliver the requested reactive power.

Figure 7:
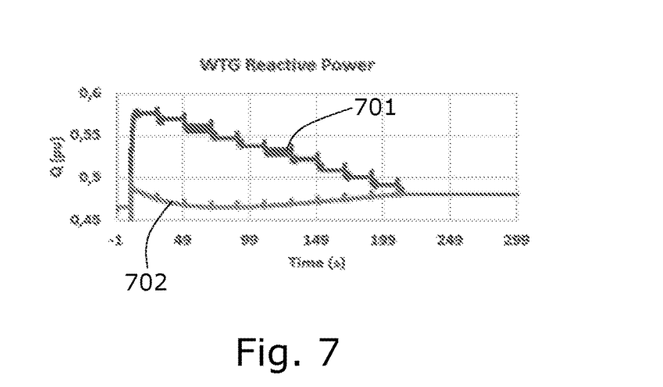
FIG. 7 illustrates what happens when the wind turbine generators is requested to deliver short-term reactive power.

FIG. 7 illustrates that when the wind turbine generators is requested to deliver short-term reactive power by overloading the power converters of wind turbine generators short-term, the reactive power production from the wind turbines increases by the short-term part 701 of the reactive power production added to the steady state part 702 of the reactive power production.

Figure 8:
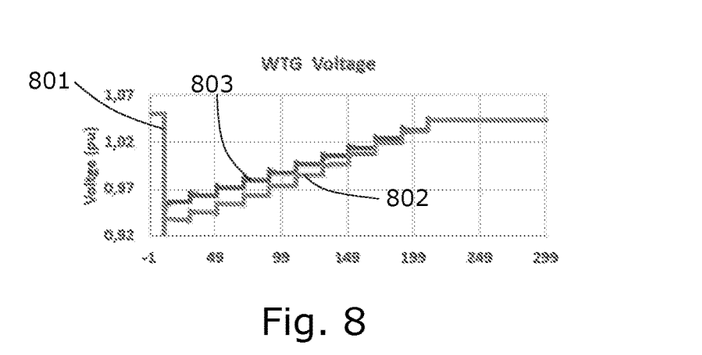
FIG. 8 illustrates that the WTG voltage, after the initial power drop slowly recovers.

FIG. 8 illustrates that the WTG voltage, after the initial power drop 801 slowly increase as the adjustment of the on load tap changers kicks in 802. In addition, the short-term generation of reactive power also gives a contribution to the real power voltage 803, but not to completely compensate for the voltage drop.

Figure 9:
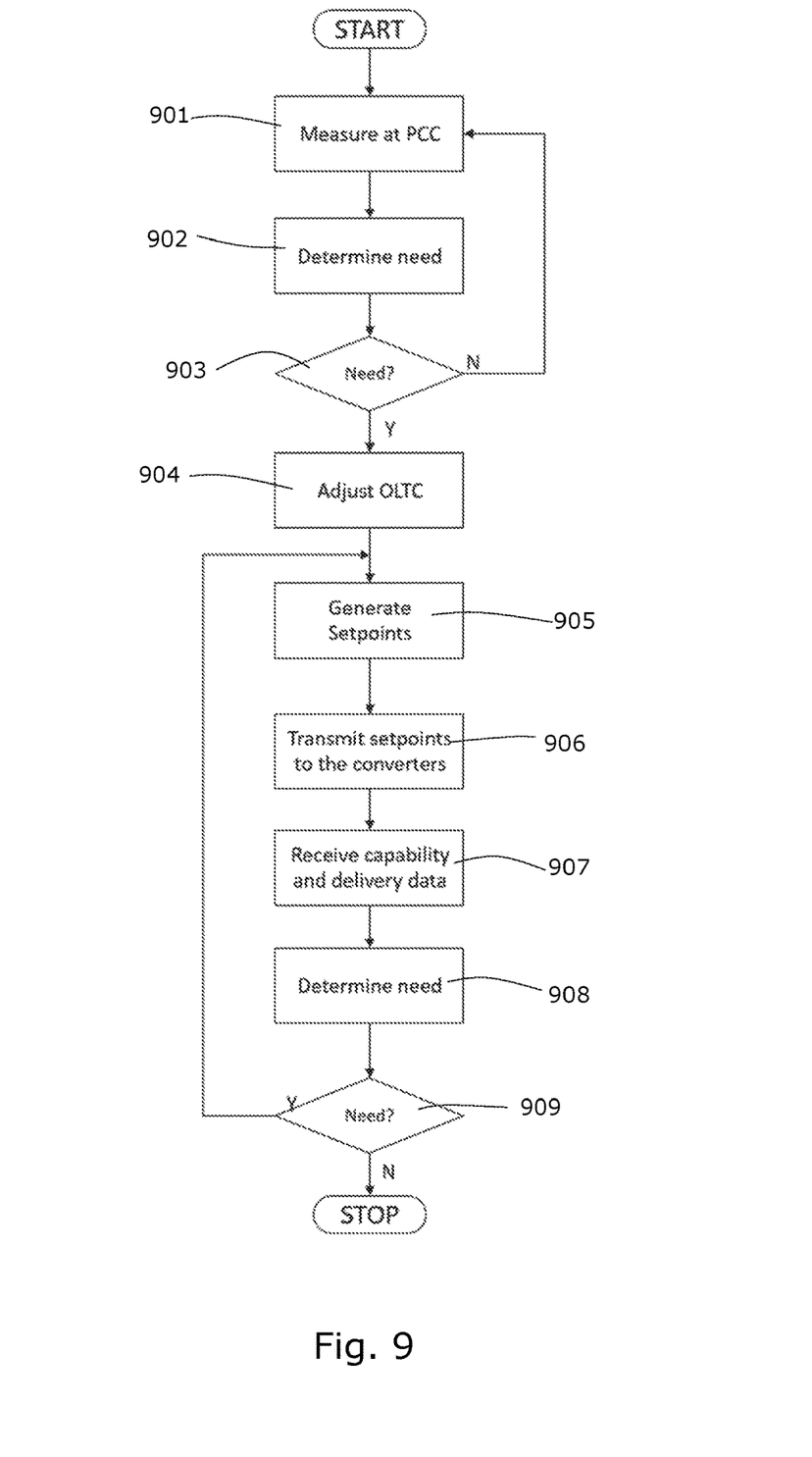
FIG. 9 is a flow diagram illustrating the control exerted by the power plant controller (PPC).

FIG. 9 illustrates, with a flow diagram, a possible implementation of the control exerted by the power plant controller (PPC) 201. In 901 the PPC measures the reactive power, the voltage and possible other parameters at the point of common coupling 209 at the high voltage side of the transformer 205. Then in 902, the PPC determines, based on the measured data and the requested data from the TSO, whether there is a need for extra short-term reactive power. If there is a need 903, the power plant controller in 904 adjust the OLTC 402 in the power plant transformer 205. Then, in 905, the PPC generates reactive component setpoints for the wind turbine generators 203, and in 906 transmits the reactive component setpoints to the converter controllers 310. At 907, the PPC receives capability data and delivery data from the wind turbine generators 203 and uses this data to generate new setpoints, and in 908, the PPC again determines whether there still is a need for short-term reactive power, and if this is the case, in 909, goes back to 905. This is of course only one possible implementation; there are many ways to implement the solution in software.

Figure 10:
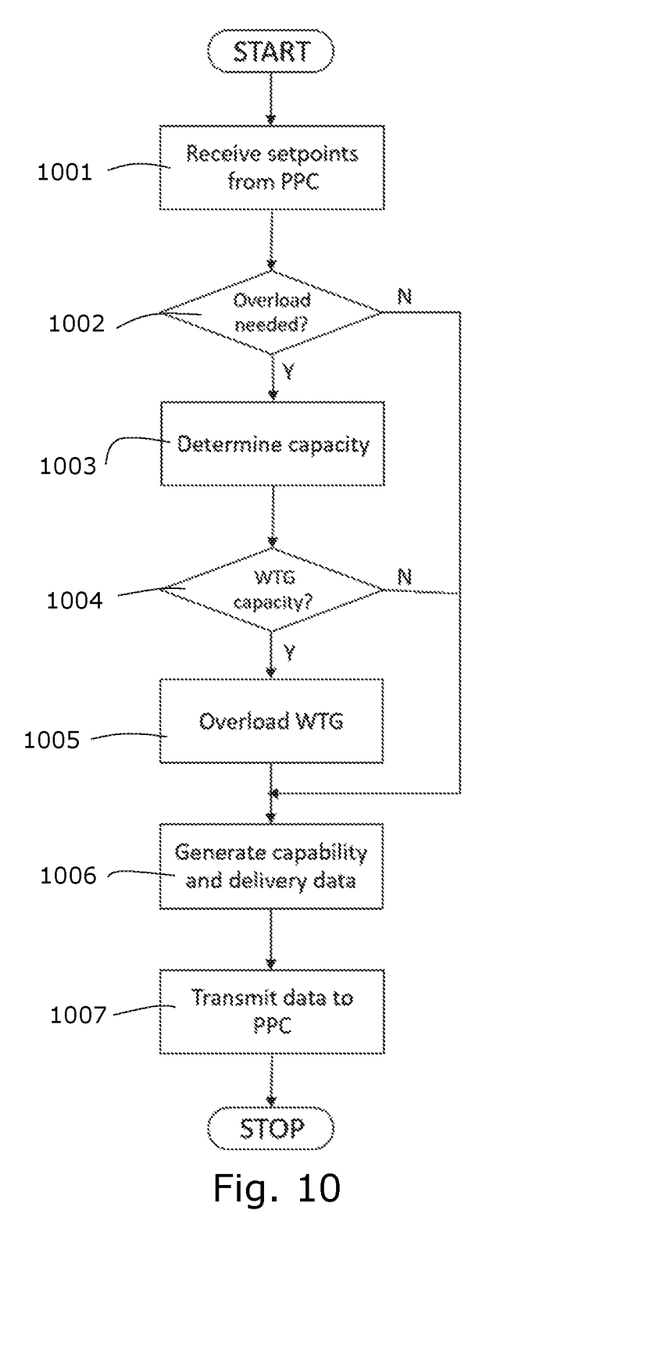
FIG. 10 is a flow diagram illustrating the control exerted by the converter control for a wind turbine generator.

FIG. 10 illustrates a possible implementation of the control exerted by the converter controller 310 for a wind turbine generator 203. When, in 1001, the converter controller 310 receives reactive component setpoints from the PPC, the converter controller checks, in 1002, whether short-term overload is needed. If this is the case, the converter controller, in 1003, determines the overload capabilities, for instance by monitoring the temperature of the components in the power converter relative to the components maximum temperature, and if there is an overload capability, the converter controller 310 checks, in 1004, whether the wind turbine generator is able to deliver short-term overload, if this is the case, then, in 1005, overloading the power converter of the wind turbine generator is generated according to the received reactive component setpoints. Then, in 1006, capability data and delivery data is generated, and, in 1007, transmitted to the PPC.

In case 1002 that overload is not needed or in case 1004 the wind turbine generator do not have the capability to deliver extra reactive power, the wind turbine generator is not overloaded, The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling reactive power exchange between a power grid and a wind power plant comprising (i) a plurality of wind turbine generators each having a corresponding power converter with a converter controller, (ii) a power plant controller generating reactive component setpoints for the wind turbine generators, and (iii) a transformer with an on load tap changer coupled between the wind power plant and the power grid, wherein the method comprises:

determining a need for reactive power exchange between the wind power plant and the power grid;

adjusting a configuration of the on load tap changer in the transformer to provide a requested reactive power;

generating by the power plant controller reactive component setpoints for the wind turbine generators, wherein the reactive component setpoints comprise a steady state part and a short-term part, wherein the steady state part does not exceed steady state capabilities of the power converters of the wind turbine generators, and wherein the short-term part exceeds the steady state capabilities of the power converters of the wind turbine generators; and operating the wind turbine generators in accordance (i) with the short-term part of the reactive component setpoints to overload the power converters of the wind turbine generators when the transformer is being adjusted to provide the requested reactive power and (ii) with the steady state part of the reactive component setpoints after the transformer has been adjusted to provide the requested reactive power.

2. The method according to claim 1, wherein the power plant controller is configured to receive capability data from the converter controllers, the capability data comprises at least one of:

short-term reactive power overload capabilities;

remaining time for short-term reactive power overload capabilities; or remaining reactive power overload capabilities factor.

3. The method according to claim 2, wherein the capability data further comprises the steady state capabilities for reactive power.

4. The method according to claim 2, wherein the converter controllers each are configured to:

generate the capability data; and transmit the capability data to the power plant controller.

5. The method according to claim 2, wherein the converter controllers each are configured to:

generate delivery data for how much of the short term reactive overload capabilities has been delivered from the wind turbine generator; and transmit the delivery data to the power plant controller.

6. The method according to claim 2, wherein the method further comprises:

receiving the capability data from the converter controllers;

generating reactive component setpoints for the converter controllers based on the capability data; and transmitting reactive component setpoints to the converter controllers.

7. The method according to claim 1, further comprising transmitting a reactive component setpoint to a wind turbine generator of the wind turbine generators, wherein the reactive component setpoint is a sum of the steady state part and the short-term part.

8. The method according to claim 1, wherein, the reactive component setpoint transmitted to a wind turbine generator comprises the steady state part and the short-term part as specific values for each part.

9. The method according to claim 1, wherein if the short-term overload capability of the power converters are not sufficient to meet the reactive power demands, the power plant controller activates compensation equipment.

10. The method according to claim 1, wherein the need for reactive power exchange is determined when at least one of:

a difference between the requested reactive power and a supplied reactive power measured at a point-of-common-coupling is larger than a minimum-allowed-change-value;

a steady-state delivery of reactive power is exceeding a maximum fraction of the reactive power steady-state capabilities; or a measured voltage at the point-of-common-coupling is within an allowable-voltage-range.

11. The method according to claim 1, wherein when determining the need for reactive power exchange and adjusting the configuration of the on load tap changer in the transformer, the on load tap changer gradually changes a voltage level at a medium voltage side of the transformer, and the reactive component setpoints are generated for the wind turbine generators to supply the requested reactive power, and the reactive component setpoints are gradually adjusted to compensate for the gradual changes caused by the on load tap changers.

12. The method according to claim 1, wherein operating the wind turbine generators, when the short-term part of the reactive component setpoints is different from zero, comprises overloading the power converters of the wind turbine generators to generating more reactive power than the maximum steady state power generation.

13. A wind power plant comprising:
   a plurality of wind turbine generators each having a corresponding power converter with a converter controller;
   a power plant controller generating reactive component setpoints for the wind turbine generators; and
   a transformer with an on load tap changer coupled between the wind power plant and a power grid, wherein:
      when a need for reactive power exchange between the wind power plant and the power grid is determined, a configuration of the on load tap changer is adjusted to provide a requested reactive power;
      the power plant controller generates reactive component setpoints for the wind turbine generators, wherein the reactive component setpoints comprise a steady state part and a short-term part, wherein the steady state part does not exceed steady state capabilities of the power converters of the wind turbine generators, and wherein the short-term part exceeds the steady state capabilities of the power converters of the wind turbine generators; and
      the wind turbine generators are operated in accordance (i) with the short-term part of the reactive component setpoints to overload the power converters of the wind turbine generators when the transformer is being adjusted to provide the requested reactive power and (ii) with the steady state part of the reactive component setpoints after the transformer has been adjusted to provide the requested reactive power.

14. A power plant controller for controlling reactive power exchange between a power grid and a wind power plant, comprising:
   a plurality of wind turbine generators each having a corresponding power converter with a converter controller;
   a power plant controller generating reactive component setpoints for the wind turbine generators; and
   a transformer with a on load tap changer coupled between the wind power plant and the power grid, wherein the power plant controller is arranged to:
      determine a need for reactive power exchange between the wind power plant and the power grid;
      adjust a configuration of the on load tap changer in the transformer to provide a requested reactive power;
      generate reactive component setpoints for the wind turbine generators, wherein the reactive component setpoints comprise a steady state part and a short-term part, wherein the steady state part does not exceed steady state capabilities of the power converters of the wind turbine generators, and wherein the short-term part exceeds the steady state capabilities of the power converters of the wind turbine generators; and
      operate the wind turbine generators in accordance (i) with the short-term part of the reactive component setpoints to overload the power converters of the wind turbine generators when the transformer is being adjusted to provide the requested reactive power and (ii) with the steady state part of the reactive component setpoints after the transformer has been adjusted to provide the requested reactive power.

* * * * *